United States Patent Office 3,485,788
Patented Dec. 23, 1969

3,485,788
ELASTOMERIC CHLORINATED POLYETHYLENE COMPOSITIONS AND METHOD OF PRODUCING SAME
Frank C. Csaszar, Morris Plains, N.J., assignor, by mesne assignments, to The Dow Chemical Company, Midland, Mich., a corporation of Delaware
No Drawing. Filed Aug. 24, 1964, Ser. No. 391,760
Int. Cl. C08f 45/58, 27/03
U.S. Cl. 260—33.8                                        15 Claims

ABSTRACT OF THE DISCLOSURE

The invention more particularly relates to plasticization or oil extension of high molecular weight chlorinated polyethylene elastomers especially with low molecular weight normally liquid chlorinated hydrocarbons and to the new and improved products produced thereby, and also vulcanization of the plasticized or oil extended chlorinated polyethylene compositions to produce new and improved cured chlorinated polyethylene elastomers.

---

This invention relates to elastomeric chlorinated polymers of ethylene, and more particularly to methods of treating chlorinated polyethylene elastomers to improve or modify the properties thereof. It also relates to new and improved products produced on vulcanization of chlorinated polyethylene compositions obtained by such method.

Certain chlorinated polymers of ethylene of high molecular weight have been found to be especially good elastomeric materials curable to low cost rubber products. Such elastomers are well suited for many common elastomer applications but did not have the combination of desired properties for other special applications and particularly those in which extrusion of the elastomer was required. In an effort to improve or modify the properties of these chlorinated polyethylene elastomers it was proposed to admix additives with the chlorinated polyethylenes to extend or plasticize the chlorinated polymers. However, when it was attempted to add extenders or plasticizers by the customarily employed procedures it was found that such chlorinated polyethylenes did not behave like ordinary elastomers and that extension and plasticization was extremely difficult to accomplish. In fact, such chlorinated polyethylenes were subject to impractically long mixing times involving a matter of many hours. Power consumption by the mixing apparatus was also found to be high and increased the cost of the operation to an uneconomical level. Moreover, the product formed even after such lengthy and high cost mixing was found to be less than completely admixed and lacked satisfactory homogeneity for many practical applications.

An object of the present invention is to provide a method for extending and plasticizing chlorinated polyethylene elastomers. Another object of the invention is to provide extended chlorinated high molecular weight polyethylene elastomers. A further object is to provide new and improved vulcanized products based on extended elastomers of chlorinated polyethylene. Other objects and advantages will be evident from the following description of the invention.

It has been found that chlorinated high molecular weight polyethylene elastomers may be readily extended and plasticized and the problem of doing so overcome by admixing the extending or plasticizing material with the chlorinated polyethylene while the chlorinated polymer is at a high temperature above about 200° F. but not in excess of about 400° F. At such temperatures the chlorinated polyethylene elastomers are subject to decomposition and thermal degradation but this problem is overcome by use of a heat stabilizing material for the chlorinated polyethylene. The method according to the present invention therefore involves, in its broader aspects, adding to the chlorinated polyethylene a stabilizer material to protect the chlorinated polyethylene against heat decomposition, and then subjecting the heat-stabilized chlorinated polyethylene along with the material for extension or plasticization to mixing at a temperature above 200° F. but not in excess of about 400° F. At such temperatures the chlorinated polyethylene readily accepts extenders and plasticizers and forms therewith compositions of especially good homogeneity. Moreover, such homogeneous compositions are produced by such high temperature mixing in a most efficient manner with required mixing time being usually only a matter of about ½ to 10 minutes, more usually about 1 to 5 minutes. Such mixing may also be carried out in conventional mixing apparatus at substantially reduced power consumption thereby further reducing cost of the product.

The elastomeric polyethylenes which are the subject of treatment by the method of the invention are those having a chlorine content between about 20–48% by weight and derived by chlorination of linear, high density polyethylene. The terms "linear" or "substantially linear," as used herein and the appended claims, shall mean a polyethylene characterized by high density and at most only nominal short chain branching in the form of methyl groups, usually less than about 10 methyl groups per 1,000 carbon atoms in the molecule, more commonly 0 to 5 methyl groups per 1,000 carbon atoms. The chlorinated polyethylenes most beneficially treated by the invention are those having ultra high molecular weight corresponding to an intrinsic viscosity greater than about 2.5 up to about 6.0 in o-dichlorobenzene at 100° C. The extenders and plasticizers which may be added to the chlorinated polyethylenes by the method of the invention are those generally suitable for use with chlorine-containing polymers. Such extenders and plasticizers are well-known and commercially available materials. Examples of such materials include the highly aromatic oils, naphthenic oils, chlorinated aliphatic and aromatic hydrocarbons, the epoxidized oils such as epoxidized soya bean oil, and the dibasic ester plasticizers of alcohols having 4 to 16 carbon atoms and derived from the acids such as phthalic, adipic, sebacic, phosphoric and benzoic.

In practice of the invention the chlorinated polyethylene is preferably first admixed with a heat stabilizer to protect the chlorinated polyethylene against degradation by dehalogenation as it is subsequently heated above the temperatures at which decomposition of the polymer occurs. The heat stabilizers employed may be those well known materials commonly used with the chlorine-containing resins. Examples of such stabilizers include inorganic salts and organic complexes and salts of metals such as barium, cadmium, tin, zinc, lead, sodium, etc. Also especially suitable are the liquid epoxy resins such as those prepared by reaction of epichlorohydrin and Bisphenol A. The amount of heat stabilizer added is usually between about 1 to 15 parts per 100 parts of the chlorinated polyethylene, more usually between about 3 to 10 parts. After addition of the heat stabilizer the chlorinated polyethylene is ready for heating and addition of the extending or plasticizing additive. Admixing of the extender or plasticizer is satisfactorily accomplished in conventional compounding apparatus, for example, a Banbury mixer or two roll rubber mill. Heating of the polymer during mixing may be accomplished by supplying heat through the mixing apparatus and/or by the frictional heat of the mixing operation. As a general proposition the extender or plasticizer additives may be added before or during the time when the chlorinated polyethylene is heated above the critical temperatures.

Because of possible excessive loss of additive due to the low temperature incompatibility of such materials it is desirable that the additive be added at a time when no more than about 4 or 5 minutes remains before the chlorinated polymer is heated above 200° F. This may be accomplished readily by preheating of the mixing apparatus and/or chlorinated polymer to from at least about 150° F. up to near or above the temperature of 200° F. before addition of the chlorinated hydrocarbon. The invention has been found to permit the addition of relatively large amounts of extending or plasticizing materials to the chlorinated polyethylenes. Thus, the method may be employed to add only small amounts of about 10 parts per 100 parts of the chlorinated polymer or amounts ranging up to as much as 150 parts, or even more, with little additional mixing time and no power consumption increase. In a specific embodiment of the invention the chlorinated polyethylene and a heat stabilizer are charged to the mixing apparatus and preheated to a temperature near or above the critical temperature, usually at a temperature between about 150° F. to 230° F., preferably between about 180° F. to 230° F. The extender or plasticizer is then added and readily admixed while the chlorinated polyethylene is above the critical temperature of 200° F. Excellent results are obtained on heating to above about 240° F. up to about 320° F., particularly with the higher molecular weight chlorinated polymers. At such high temperature level the additive is readily combined with the chlorinated polymers in a matter of only minutes, usually between about 1 to 10 minutes. If desired, other additives including filler and curatives may then be admixed with the resulting chlorinated polyethylene composition, the curatives usually being added after adjusting the mass to a lower temperature, usually between about 150–240° F. Before addition of filler and/or curatives the chlorinated polyethylene composition produced by the present embodiment is a highly homogeneous, highly stable material which, if desired, may be sheeted out for storage and/or shipping for subsequent compounding and addition of such additives. In another embodiment of the invention the filler material and other solid additives with the usual exception of the curatives are added to the chlorinated polyethylene before the polymer is heated above the critical temperature. In this embodiment of the invention advantage is taken of the frictional heat generated by mixing of the solid filler material. The chlorinated polyethylene and a heat stabilizer in this embodiment are charged to the Banbury mixer which has been preheated to a temperature above about 150° F., preferably 180–230° F. After about ½ minute mixing the extender or plasticizer is added and within a short time of about 1–2 minutes the solid filler material is also added. Heat generated by mixing of the filler facilitates the rise in temperature of the stock such that the desired temperatures are reached within a short period of about ½ to 5 minutes, more usually about 1–3 minutes. As the critical temperature of the chlorinated polyethylene is reached the chlorinated polymer and extender or plasticizer additive are homogeneously blended in a very short time. Generally, the temperature to which the chlorinated polymer is subjected at the high levels may be controlled by cooling of the Banbury rolls or mixing apparatus, as by the use of ordinary cooling water, to prevent temperatures from exceeding about 400° F. above which temperature undesirable decomposition and dehalogenation take place. When curatives are to be added it is generally desirable to make such addition after cooling of the stock below a temperature of 240° F., preferably between about 200° F. to 230° F. An overall compounding operation including addition of curatives may be carried very efficiently in less than 10 minutes, usually between about 3 to 8 minutes. The extended or plasticized compositions produced by the invention may be subjected to further mechanical working either in mixing apparatus or to form a finished product as in an extruder. In such working it has been found important to rapidly heat the compositions above about 200° F., preferably in less than 5 minutes time. Such rapid heating assures a product of high tensile strength properties which have been found substantially depreciated in absence of such rapid heating.

It has also been found that compositions useful for producing wire jacketing of high toughness, strength, and tear are provided when certain elastomeric chlorinated polyethylenes are homogeneously combined or extended with a co-vulcanizable chlorinated hydrocarbon in an amount of at least 40 parts up to about 120 parts of chlorinated hydrocarbon per 100 parts of chlorinated polyethylene. Wire jacketing of especially good properties is produced by incorporating suitable filler material and curatives which effect co-vulcanization of the chlorinated polyethylene and chlorinated hydrocarbon. The extended filled composition containing the curing system may then be sheeted out on a rubber mill. The resulting compound is eminently suited for wire jacketing and after cutting it into strips it may be extruded as a jacket over tinned copper wire in conventional apparatus. Extrusion temperatures are usually about 200° F. to 250° F. The jacketing may be vulcanized by application of heat and pressure in conventional equipment such as a continuous steam vulcanizer in which temperatures are usually between about 350° F. to 420° F. and steam pressures between about 183 to 240 p.s.i.

The chlorinated hydrocarbon added to the chlorinated polyethylene may be a chlorinated aliphatic hydrocarbon or chlorinated aromatic hydrocarbon, or a mixture thereof. The chlorinated hydrocarbon extenders useful in the invention have a chlorine content between 20% to 70% by weight and low molecular weight ranging between 200 to 2,000. The preferred chlorinated hydrocarbons are normally liquid materials having molecular weight between 200 to 1,000. The chlorinated aromatic hydrocarbons usually employed are the chlorinated biphenyls having chlorine content between 20% to 70%, preferably between about 20 to 45%. The particularly preferred extenders are the normally liquid chlorinated aliphatic hydrocarbons having chlorine content of about 30% to 55% and molecular weight between about 300 to 1,000. It is particularly important in order to produce satisfactory compositions that chlorinated hydrocarbon extender be added in an amount greater than 40 parts up to about 120 parts by weight per 100 parts of the chlorinated polyethylene. Less than 40 parts is insufficient to provide good flexibility and elongation while greater than 120 parts tends to depreciate the desired properties of the composition. Best results are obtained with the compositions in which between about 50 to 100 parts of the chlorinated aliphatic hydrocarbon are present. Not only does the addition of the chlorinated hydrocarbon impart desired flexibility and elongation but, in the amounts required, also imparts excellent processability to the chlorinated polyethylene compositions such that the extended unfilled compositions will have Mooney viscosity at 212° F. between about 30 to 80. The extended compositions after addition of filler will also have a Mooney viscosity between 40 to 80. Mooney viscosity values may be determined according to ASTM D927–55T.

Filler material is incorporated in the wire jacketing composition provided by the invention in an amount generally between about 20 to 150 parts per 100 parts of the chlorinated polyethylene. Preferably, the amount of filler represents between about 40 to 120 parts per 100 parts by weight of the chlorinated polyethylene. Suitable fillers include the carbon blacks such as furnace black, channel black, thermal black, lamp blacks and the like, silica, titanium dioxide, mica, clays, carbonates such as magnesium and calcium carbonate and talc. It is desirable that 10 parts or more of the filler is a carbon black which enhances the properties of U.V. (ultra violet) resistance, toughness, tear, abrasion resistance and processability. Other preferred filler materials benefitting the properties of the wire jacketing are clays, silicas, talcs, silicates, and the like.

Wire jacketing of especially good flexibility and elongation is produced in accordance with the invention from the carbon black filled compositions which have incorporated therein a suitable curing agent for co-vulcanization of the chlorinated polyethylene and chlorinated hydrocarbon extender. Suitable curing agents are those selected from the group consisting of the peroxides and the polyfunctional aromatic and aliphatic amines. Especially good results are obtained with the polyfunctional amines and particularly with the aliphatic polyfunctional amines such as triamino-triethyl propane, hexamethylenediamine carbamate, triethylenetetramine, tetraethylene pentamine, hexamethylenediamine, 2-mercaptoimidazoline, hexamethylenetetramine and triethanolamine. Suitable polyfunctional aromatic amines include m-xylylene diamine, p-xylylene diamine, benzyl dimethylamine, o-hydroxybenzyl dimethylamine and m-phenylene diamine. Examples of suitable peroxides which may be emplyed in curing the chlorinated polyethylenes include benzoyl peroxide, dicumyl peroxide, di-tertiary butyl peroxide, diacyl peroxides, 2,5-bis-(tertiary butyl peroxy 2,5-dimethyl) hexane. While the chlorinated polyethylenes employed in the invention contain little or no unsaturation it has been found that materials conventionally employed in the curing of the unsaturated elastomeric materials such as natural rubber, etc., may be used to advantage in preparation of the chlorinated polyethlene elastomers. For example, the addition of sulfur or a compound containing a reactive sulfur group in combination with the curing agent has been found not only to increase cure rate but also to produce an elastomer of very good properties. Examples of sulfur-containing compounds which may be employed to advantage include dipentamethylene thiuran tetrasulfide, benzothiazyl disulfide, and 2-mercaptobenzothiazole. Other compounds such as the oxides of the metals of Groups II and IV of the Periodic Table may also be employed to accelerate curing of the elastomer. Examples of preferred metal oxides to be used as accelerators include magnesium oxide, zinc oxide, and lead oxide. Particularly good results are obtained with curing systems in which the polyfunctional amines are combined with sulfur or sulfur-containing compound, the amount of sulfur-containing compound being in a minor proportion to the amine, usually about 5–25%. The peroxide curing agent gives excellent results when combined with minor amounts of about 0.5 to 5 parts, preferably 0.5 to 3 parts, of the metal oxide accelerators such as magnesium oxide. The combination of the polyfunctional amine and peroxide curing agents results in the formation of particularly good chlorinated polyethylene elastomers. The amine and peroxide curing agents may be employed in a wide range of proportions with the amine generally representing about 5 to 75% of the combination. When employed in minor proportions of about 5 to 30% the polyfunctional amines have the apparent effect of accelerating the vulcanizing action of the peroxide agents with optimum curing obtained at desirably high rates. Generally, the particular curing agent is employed in amounts between about 1–15 parts, preferably 2–8 parts, per hundred parts of the chlorinated polyethylene. Curing of the compositions of the invention may be carried out generally at temperatures between about 200–450° F. under pressures of the order of about 100 to 1,000 p.s.i., and even higher. Under the more preferred conditions in which a conventional continuous steam vulcanizer is employed to produce a wire jacketing the compositions are cured at temperature between about 380 to 420° F. under steam pressure between 183 to 240 p.s.i.

The chlorinated polyethylenes from which wire jacketing is produced by the invention are those characterized by having a chlorine content between 20–48%, preferably 25–45% less than 1% crystallinity as measured by differential thermal analysis, and ultra high weight average molecular weight corresponding to an intrinsic viscosity between about 2.5 to 6.0, preferably 3 to 5, in o-dichlorobenzene at 100° C. Such chlorinated polyethylenes are derived by chlorination of a substantially linear, high density polymer of ethylene having ultra high molecular weight of at least about 700,000 up to about 5,000,000, preferably at least about 1,000,000 up to about 3,500,000. Particularly suitable linear high molecular weight polyethylene which may also be characterized by containing long chain polyethylene branches is produced as described in British Patent 858,674 of June 11, 1961 to Allied Chemical Corporation, by gas phase polymerization of anhydrous, oxygen-free ethylene below the softening point of the polyethylene over a porous, frangible catalyst of an inorganic compound of chromium and oxygen and an active metal alkyl on a support of the group consisting of silica and silica-alumina. The polyethylenes produced thereby contain residue of the chromium-silica catalyst systems dispersed throughout the polyethylene in an amount of at least about .001%, usually .001–.002%, by weight. The chromium-silica catalyst material added during polymerization is retained in the polyethylene during chlorination and contributes to the properties of the chlorinated polyethylene employed in the elastomeric compositions produced therefrom. Prior to chlorination the polyethylene from which the chlorinated polyethylene is derived has a density between about 0.935 and about 0.985 and a crystallinity of at least 75%, and customarily in the range of 75% to 85%, as determined, for example, by differential thermal analysis. The preferred polyethylenes produced by British Patent 858,674 have weight average molecular weight between 1.0 million and about 5.0 million, preferably between 1.0 to 3.5 million, as calculated according to the method of P. S. Francis et al. from the viscosity of about 0.05 to 0.1 gram per 100 cc. solution in Decalin at 135° C. using the equation:

$$n = 6.77 \times 10^{-4} M^{0.67}$$

where $n$=intrinsic viscosity, $M$=weight average molecular weight (J. Polymer Science, vol. 31, pp. 453–466—September 1958)

Chlorinated polyethylene of less than 1% crystallinity is desirably prepared for use in the invention by chlorination of the high molecular weight polyethylene in a heterogeneous medium in stages defined by introduction of chlorine at a temperature first below and then above the crystalline melting point of the polymer, as described in copending application of Chapman et al., Ser. No. 86,309, filed Feb. 1, 1961. Preparation of the chlorinated polyethylene is most desirably accomplished by two-stage suspension chlorination of the linear, ultra high molecular weight polyethylene with first-stage chlorination being carried out in aqueous slurry at temperature below the crystalline melting point of the ethylene polymer, preferably at a temperature of about 60° C. to 130° C., desirably at 90–110° C., until at least about 5 percent, preferably about 10 percent, of chlorine has been introduced into the polymer. In the second stage the chlorination is continued in the aqueous slurry at a temperature maintained above the crystalline melting point of the polymer but below the softening point of the chlorinated outer coating thereof until the desired chlorine is added. Second-stage chlorination temperatures are of the order of at least about 135° C. and preferably lie in the range of about 135° C. to 150° C. If desired, chlorination in the second-stage may be carried out at a temperature above the crystalline melting point of the polymer for time sufficient to add at least about 5 percent chlorine by weight, preferably until at least a total of 25 percent chlorine is added to the polymer, and the chlorination then continued at a lower temperature, e.g. 110° C. to 120° C., until the desired total chlorine is added.

Chlorination of the linear polyethylene of 1–5 million molecular weight by the subject two-stage process will produce the particularly preferred chlorinated polyethylenes having 20–48% chlorine and high molecular weight corresponding to an intrinsic viscosity within the range of at least about 2.5 up to about 6.0 in o-dichlorobenzene at 100° C. These preferred chlorinated polyethylenes are also chemically inert, being insoluble at 20–25° C. in organic solvents such as esters, acids and alcohols. They have tensile strength values according to ASTM Method D. 638–58T (at drawing rate of 2 inches per minute) of at least about 2,500 p.s.i., usually between about 2,500 p.s.i. and about 4,500 p.s.i. The chlorinated polyethylenes also have true ultimate tensile strengths according to ASTM Method D. 638–58T of at least about 11,000 p.s.i., with the preferred materials of 28–42% chlorine content having true ultimate tensile strength values between about 11,000 and 20,000. The chlorinated polyethylenes which have less than about 1% crystallinity by differential thermal analysis also are characterized by relatively low glass transition temperatures at least as low as about $-15°$ C. for the 20% chlorine material and about 18° C. for the 48% chlorine material. The preferred chlorinated polyethylenes have glass transition temperatures at least as low as about $-27°$ C. for the 28% chlorine material ranging to about 5° C. for the 45% chlorine content chlorinated polyethylene. The glass transition temperatures, a second order transition temperature, can be determined by plotting the stiffness modulus of the sample as a function of temperature, and can be defined as the temperature at which the stiffness modulus of the sample possesses a value of $1.45 \times 10^4$ p.s.i. or $10^9$ dynes/cm.$^2$. The determination may be made in accordance with ASTM Test D 1053–61. In effect, the glass transition temperature is that temperature below which the chlorinated polymers become brittle. Above the glass transition temperature the polymers become more flexible and rubbery. The low glass transition temperatures of the chlorinated polyethylenes contribute to the ability of the compositions of the invention to retain good elastomeric properties at low temperatures.

The following examples in which parts and percentages are by weight demonstrate the practice and advantages of the present invention.

EXAMPLE 1

Chlorinated polyethylene of 40% chlorine and intrinsic viscosity of 4.0 in o-dichlorobenzene at 100° C. was admixed in an amount of about 100 parts with about 5 parts of an epoxy heat stabilizer prepared by reaction of epichlorohydrin with Bisphenol A and obtained under the trademark "Epon" 828 from the Shell Chemical Company. The chlorinated polyethylene was prepared by staged aqueous slurry chlorination of low pressure, linear polyethylene having a weight average molecular weight of about 1½ million and density of 0.94. Chlorination in the first stage was carried out at about 100° C. until about 17% chlorine was added to the ethylene polymer followed by second-stage chlorination at a temperature of 140° C. until a total of about 40% by weight chlorine was added. The high molecular weight polyethylene employed was prepared in accordance with British Patent 858,674 (Example 6) by gas phase polymerization of anhydrous oxygen-free ethylene over a catalyst of magnesium dichromate on a porous support of about 90% silica and 10% alumina in the presence of aluminum triisobutyl. The chlorinated polyethylene had a glass transition temperature of about $-23°$ C. (ASTM D1053–63) and 0% crystallinity as determined by differential thermal analysis. The chlorinated polyethylene and epoxy stabilizer were charged to a Banbury Mixer, Model No. B, and admixed at a speed of about 116 r.p.m. at a starting temperature of about 180° F. by internal steam heating. After about ½ minute mixing there was then added to the chlorinated polyethylene 85 parts of a chlorinated paraffin having a chlorine content of about 40% and molecular weight of about 580. The chlorinated hydrocarbon was readily accepted by the fluxed chlorinated polyethylene and formed a homogeneous mass therewith after a total mixing time of about 2 minutes above a temperature of 200° F. Temperature during homogenization reached 280–310° F. and was reduced to about 240° F. for the addition as curatives of 0.3 part sulfur and 14 parts of dicumyl peroxide. These additives were admixed with the extended chlorinated polyethylene over the course of about 2 minutes and after a total mixing time of 8 minutes at the reduced temperature of 225° F. The resulting stock was then sheeted out on a two roll rubber mill and the resulting sheet cut into 4 x 5 inch slabs having a thickness of about 0.085 inch. These slabs were then inserted into a suitable mold which was placed in a press where the slabs were cured at a pressure of about 500–600 p.s.i. and at a temperature of about 150–170° C. for a period of about 30 minutes. The resulting product was tested to determine degree of vulcanization by placing a 0.2 gram sample in a stainless steel screen cage within a Soxhlet extractor. The sample was extracted with o-dichlorobenzene for 6 hours at about 212° F. and then oven dried for 24 hours at 100° C. at 1–2 mm. pressure. Gel or degree of vulcanization was determined by difference in weight between original and dried extracted sample and found to be a high 92% confirming covulcanization of the chlorinated polyethylene and chlorinated hydrocarbon. Evaluation of the vulcanized samples also showed the product to have an ultimate tensile strength of 800 p.s.i. by ASTM D 412–51T, ultimate elongation of about 450% by ASTM D 412–51T, and a modulus (300%) of 450 p.s.i. by ASTM D 412–51T. The vulcanized product also had a Mooney viscosity of 55 as determined in accordance with ASTM D927–55T.

EXAMPLE 2

The chlorinated polyethylene employed in Example 1 was admixed in an amount of about 100 parts with 5 parts of "Epon" 828 heat stabilizer and the resulting mixture charged to the Banbury mixer which had been preheated to a temperature of about 200° F. To the chlorinated polyethylene there was immediately added about 80 parts of chlorinated aliphatic hydrocarbon of 40% chlorine and molecular weight of about 580. The resulting mass was allowed to work on the Banbury mixer for about 1 minute and there was then added 2 parts magnesia, 1 part stearic acid, 70 parts hard clay and 20 parts FEF Black, a carbon black obtained from the United Carbon Company. After such addition the temperature of the mass increased rapidly to about 250–260° F. and a homogeneous mixture was formed in about 5 minutes after such addition. Cooling water was then applied externally to Banbury mixing chamber jacket to decrease the temperature of the stock to between about 230–240° F. and there was then added as curatives about 1 part sulfur and 6 parts mercaptoimidazoline. Following addition of the curatives the stock was allowed to mix for an additional 1 minute at a temperature of about 230–240° F. and was then sheeted out as a ¼ inch thick mat on a two roll rubber mill. The mat was cut into strips and charged to a 14:1 L/D ratio J. Royle & Sons Company extruder, Model No. 1, from which the compound was extruded at a temperature of about 240–250° F. onto 145 tinned copper wire with a ⅜₄ wall. The extrudate was passed to a continuous steam vulcanizer where the jacketing was cured by subjecting to a temperature of about 400° F. at a direct steam pressure of about 220 p.s.i. for 3 minutes. Samples of the vulcanized jacketing were obtained for testing by slicing pieces of the cured coating from the wire. These samples were evaluated to determine qualification according to the wire jacketing specifications of the Underwriters Laboratories (UL) and the Insulated Power Cable Engineers Association (IPCEA). Results are summarized below in Table 1.

| | Chlorinated polyethylene-chlorinated hydrocarbon co-vulcanizate | U.L. specification | IPCEA specification |
|---|---|---|---|
| Original vulcanizate: | | | |
| Tensile, p.s.i. | 2,250 | 1,800 | 1,800. |
| Elongation, percent | 650 | 300 | 300. |
| After 20 hrs. at 127° C. in air press. bomb: | | | |
| Tensile, p.s.i. | 2,260 | | 50% of orig. |
| Elongation, percent | 600 | | 50% of orig. |
| After 18 hrs. at 121° C. in ASTM oil #2: | | | |
| Tensile, p.s.i. | 2,050 | 60% of orig. | 60% of orig. |
| Elongation, percent | 450 | 60% of orig. | 60% of orig. |
| After 240 hrs. at 121° C. in circulating air oven:[1] | | | |
| Tensile, p.s.i. | 2,000 | 900 | |
| Elongation, percent | 350 | 50 | |

[1] Sample press cured at 205° C. for 2 minutes.

As shown by Table 1, the chlorinated polyethylene-chlorinated hydrocarbon covulcanized jacketing of the invention clearly satisfies the above standards. The jacketing was also found to have the following especially good properties including high tear strength, complete ozone resistance, and non-flammability.

EXAMPLE 3

Following the extending and mixing procedure of Example 2 a homogeneous composition was prepared from 100 parts of the chlorinated high molecular weight polyethylene of 40% chlorine, 60 parts of the chlorinated aliphatic hydrocarbon of 40% chlorine and molecular weight of 580, about 5 parts of "Epon" 828, 2 parts magnesia, 1 part stearic acid and 50 parts of HAF Black, a carbon black obtained from the United Carbon Company. As curatives there was added to the homogeneous composition about 1 part sulfur, 3 parts zinc oxide and 5 parts methylene-bis-orthochloroaniline. This composition had a Mooney viscosity of 78 as determined in accordance with ASTM D 927–57T. The resulting composition was sheeted out on a two roll rubber mill and the sheet cut into 4 x 5 inch slabs having a thickness of about 0.085 inch. These slabs were then inserted into a suitable mold which were placed in a press where the slabs were cured at a pressure of about 500–600 p.s.i. and at a temperature of 150–170° C. for a period of about 30 minutes. Evaluation of the vulcanized samples showed the product to have an ultimate tensile strength of 2500 p.s.i., ultimate elongation of 450%, and modulus (300%) of 1700. Tensile strength, elongation and modulus were determined in accordance with ASTM Test D 412–51T. The vulcanized product also had exceptionally good tear strength, ozone resistance and non-flammability.

EXAMPLE 4

A vulcanizate was prepared using the procedure and components of Example 3 except that the curatives consisted of 3 parts of triethylene tetramine. Slab samples prepared and tested as in Example 3 showed the vulcanizate to have an ultimate tensile strength of 2800, an ultimate elongation of 480%, and modulus (300%) of 1250.

EXAMPLE 5

A vulcanizate was prepared using the procedure and components of Example 3 except that the curatives consisted of 2.5 parts of the reaction product of ethyl chloride, formaldehyde and ammonia (Trime Base supplied by Naugatuck Chemical Company), 1 part sulfur and 7.5 parts zinc oxide. Slab samples prepared and tested as in Example 3 showed the vulcanizate to have an ultimate tensile strength of 2900, an ultimate elongation of 540%, and modulus (300%) of 1200.

EXAMPLE 6

A vulcanizate was prepared using the procedure and components of Example 3 except that the curatives consisted of 1 part hexamethylene diamine carbamate (Diak No. 1 supplied by E. I. du Pont Chemical Company), 1.3 parts of N,N-disalicylidene and 1,2-propanediamine (Copper Inhibitor 65 supplied by Dupont Company), and 0.3 part sulfur. Slab samples prepared and tested as in Example 3 showed the vulcanizate to have an ultimate tensile strength of 3200, an ultimate lenogation of 540%, and modulus (300%) of 1200.

EXAMPLE 7

A vulcanizate was prepared using the procedure and components of Example 3 except that the curatives consisted of 7 parts of dicumyl peroxide (DiCup 40C supplied by Hercules Chemical Company), and 0.3 part sulfur. Slab samples prepared and tested as in Example 3 showed the vulcanizate to have an ultimate tensile strength of 2900, an ultimate elongation of 540%, and modulus (300%) of 1000.

EXAMPLE 8

A vulcanizate was prepared using the procedure and components of Example 3 except that the curatives consisted of 0.75 part of di-t-butylperoxy-hexyne-3 (Luperco 130 XL supplied by Lucidol Division, Wallace-Tiernan Company), 0.75 part trimene base and 0.3 part sulfur. Slab samples prepared and tested as in Example 3 showed the vulcanizate to have an ultimate tensile strength of 3200, an ultimate elonagtion of 550%, and modulus (300%) of 1150.

EXAMPLE 9

A vulcanizate was prepared using the procedure and components of Example 3 except that the curatives consisted of 5 parts of para-phenylene diamine. Slab samples prepared and tested as in Example 3 showed the vulcanizate to have an ultimate tensile strength of 2900, an ultimate elongation of 500%, and modulus (300%) of 1200.

EXAMPLE 10

A vulcanizate was prepared using the procedure and components of Example 3 except that the curatives consisted of 5 parts of tetramethylthiuram disulfide (TMTD supplied by Henley Company) 2 parts of benzothiazyl disulfide (Altax supplied by R. T. Vanderbilt Company), 5 parts of zinc oxide and 1 part of sulfur. Slab samples prepared and tested as in Example 3 showed the vulcanizate to have an ultimate tensile strength of 3300 p.s.i., an ultimate elongation of 580%, and modulus (300%) of 1600 p.s.i.

It is well known practice in the art of characterizing macromolecular resins to calculate a molecular weight figure from the figure determined for intrinsic viscosity of the resin. The molecular weight figures thus calculated depend, of course, upon the particular formula used for the calculation and accordingly should be regarded as approximate rather than exact. They represent approximate weight average molecular weights.

Intrinsic viscosity, as the term is used herein, is defined as the limit, at infinite dilution, of specific viscosity ($N_{sp}$) divided by concentration (C) expressed in grams of resin per deciliter of solution. Specific viscosity is measured as: $(t-t_0)t_0$, where $t$ is the effluent time for a given quantity of polymer solution from a standard pipet and $t_0$ is the effluent time for an equal quantity of the pure solvent. Intrinsic viscosity can be determined, accordingly, by plotting $$\left(\frac{N_{sp}}{C}\right)$$

against C, at low concentrations, and extrapolating the resulting curve to 0 concentration.

The intrinsic viscosities reported herein are determined in accordance with ASTM Test D–1601–61, the units thereof being deciliters per gram. Intrinsic viscosities of the chlorinated polymers of this invention herein reported are in orthodichlorobenzene solvent at 100° C.;

and for ethylene polymers herein the intrinsic viscosities are in Decalin solvent at 135° C.

The densities of polymers reported herein are determined by ASTM Test D–792–60T at 23° C. and are in units of grams per milliliter.

Although certain preferred embodiments of the invention have been disclosed for purpose of illustration, it will be evident that various changes and modifications may be made therein without departing from the scope and spirit of the invention.

I claim:

1. The method of enhancing the properties of chlorinated high molecular weight polyethylene elastomers of chlorine content between 20–48% by weight and molecular weight corresponding to an intrinsic viscosity of at least 2.5 up to about 6 in o-dichlorobenzene at 100° C., said elastomers being produced by the chlorination of polyethylene of 700,000 to 5,000,000 molecular weight, comprising adding to said chlorinated polyethylene a stabilizer to protect the chlorinated polyethylene against heat decomposition, and mixing said heat-stabilized chlorinated polyethylene with at least 40 parts per 100 parts of chlorinated polyethylene of an additive selected from the group of extenders and plasticizers for said chlorinated polyethylene, said additive being a normally liquid chlorinated aliphatic hydrocarbon having a chlorine content of between 20% to 70% and a molecular weight between about 200 to 2,000, at a temperature above 200° F. but not in excess of a temperature of about 400° F. to homogeneously admix said additive and said chlorinated polyethylene.

2. The method of enhancing the properties of chlorinated high molecular weight polyethylene elastomers of chlorine content between 20–48% by weight and molecular weight corresponding to an intrinsic viscosity of at least 2.5 up to about 6 in o-dichlorobenzene at 100° C., said elastomers being produced by the chlorination of polyethylene of 700,000 to 5,000,000 molecular weight, comprising adding to said chlorinated polyethylene a stabilizer to protect the chlorinated polyethylene against heat decomposition, heating said heat-stabilized chlorinated polyethylene and adding thereto at least 40 parts per 100 parts of chlorinated polyethylene of an additive selected from the group consisting of extenders and plasticizers for said chlorinated polyethylene, said additive being a normally liquid chlorinated aliphatic hydrocarbon having a chlorine content of between 20% to 70% and a molecular weight between about 200 to 2,000, and admixing said additive and chlorinated polyethylene at a temperature of at least 200° F. but not in excess of about 400° F. to form a homogeneous composition consisting essentially of said stabilizer, additive and chlorinated polyethylene.

3. The method of claim 2 in which the heat-stabilized chlorinated polyethylene is preheated to a temperature of at least 200° F. prior to addition of such additive.

4. The method of enhancing the properties of chlorinated high molecular weight polyethylene elastomers of chlorine content between 20–48% by weight and molecular weight corresponding to an intrinsic viscosity of at least 2.5 up to about 6 in o-dichlorobenzene at 100° C., said elastomers being produced by the chlorination of polyethylene of 700,000 to 5,000,000 molecular weight comprising adding to said chlorinated polyethylene a stabilizer to protect the chlorinated polyethylene against heat decomposition, admixing said chlorinated polyethylene with filler material and at least 40 parts per 100 parts of chlorinated polyethylene of an additive selected from the group consisting of extenders and plasticizers for said chlorinated polyethylene, said additive being a normally liquid chlorinated aliphatic hydrocarbon having a chlorine content of between 20% to 70% and a molecular weight between about 200 to 2,000, and mixing said additive, chlorinated polyethylene and filler to increase the mass to a temperature above 200° F. but not in excess of a temperature of about 400° F. to homogeneously admix said additive and chlorinated polyethylene.

5. The method of claim 4 in which the heat-stabilized chlorinated polyethylene is preheated to a temperature of at least 150° F. prior to addition of such additive.

6. The method of producing elastomeric chlorinated polyethylene compositions suitable for conversion to highly flexible vulcanized wire coating comprising adding a heat stabilizer to a chlorinated polyethylene having a chlorine content between about 20–48% by weight, crystallinity of less than 1% as determined by differential thermal analysis and weight average molecular weight corresponding to an intrinsic viscosity between about 2.5 to 6 in o-dichlorobenzene at 100° C., said elastomers being produced by the chlorination of polyethylene of 700,000 to 5,000,000 molecular weight and subjecting the heat-stabilized chlorinated polyethylene along with a co-vulcanizable chlorinated normally liquid hydrocarbon of 20–70% chlorine by weight and molecular weight between 200 to 500 to mixing at a temperature above 200° F. but not in excess of about 400° F. to homogeneously admix at least 40 parts up to about 120 parts of said chlorinated hydrocarbon per 100 parts of said chlorinated polyethylene, and admixing between about 20 to 150 parts filler material per 100 parts of the chlorinated polyethylene and between about 1–15 parts per 100 parts of the chlorinated polyethylene of curing agent selected from the group consisting of peroxides and the polyfunctional aromatic and aliphatic amines, and mixtures thereof.

7. The method of claim 6 in which the chlorinated hydrocarbon is a normally liquid chlorinated aliphatic hydrocarbon having a chlorine content between about 30 to 55% by weight and a molecular weight between about 300 to 1,000.

8. The method of producing elastomeric chlorinated polyethylene compositions suitable for conversion to highly flexible vulcanized wire coating from a chlorinated polyethylene having a chlorine content between about 20–48% by weight, crystallinity of less than 1% as determined by differential thermal analysis and weight average molecular weight corresponding to an intrinsic viscosity between about 2.5 to 6 in o-dichlorobenzene at 100° C., said elastomer being produced by the chlorination of polyethylene of 700,000 to 5,000,000 molecular weight, comprising preheating said chlorinated polyethylene to a temperature above 200° F. adding to said preheated chlorinated polyethylene a normally liquid chlorinated hydrocarbon of 30–55% chlorine by weight and molecular weight between about 300 to 1,000 admixing said chlorinated hydrocarbon and chlorinated polyethylene along with a heat stabilizer for said chlorinated polyethylene at a temperature of at least 200° F. but not in excess of 400° F. to homogeneously admix said chlorinated polyethylene with at least 40 parts up to about 120 parts to said chlorinated hydrocarbon per 100 parts of said chlorinated polyethylene, admixing between about 20 to 150 parts filler material per 100 parts of said chlorinated polyethylene, and adding to said composition at a temperature below said softening temperature of the chlorinated polyethylene between about 1–15 parts per 100 parts of the chlorinated polyethylene of a curing agent selected from the group consisting of peroxides and polyfunctional aromatic and alphatic amines, and mixtures thereof.

9. The method of producing elastomeric chlorinated polyethylene compositions suitable for conversion to highly flexible vulcanized wire coating comprising adding a heat stabilizer to a chlorinated polyethylene having a chlorine content between about 20–48% by weight, crystallinity of less than 1% as determined by differential thermal analysis and weight average molecular weight corresponding to an intrinsic viscosity between about 2.5 to 6 in o-dichlorobenzene at 100° C., said elastomers being produced by the chlorination of polyethylene of 700,000 to 5,000,000 molecular weight heating said heat-stabilized chlorinated polyethylene to a temperature of at least about 180° F., adding to said preheated chlorinated polyethylene at least about 20 up to about 150 parts of filler per 100 parts of chlorinated polyethylene and a normal liquid chlorinated hydrocarbon of 30–55% chlorine by weight and molecular weight between about 300 to 1,000 in an amount of at least about 40 up to about 120 parts per 100 parts of said chlorinated polyethylene, mixing said chlorinated hydrocarbon, chlorinated polyethylene and filler and increasing the mass to a temperature above 200° F. but not in excess of a temperature of about 400° F. to homogeneously admix said chlorinated hydrocarbon and chlorinated polyethylene, and adding to said composition at a temperature below 240° F. between about 1–15 parts per 100 parts of the chlorinated polyethylene of a curing agent selected from the group consisting of peroxides and the polyfunctional aromatic and aliphatic amines, and mixtures thereof.

10. A composition for use in producing highly flexible wire jacketing consisting essentially of a heat stabilized chlorinated polyethylene having a chlorine content between about 20–48% by weight, crystallinity of less than 1% as determined by differential thermal analysis and weight average molecular weight corresponding to an intrinsic viscosity between about 2.5 in o-dichlorobenzene at 100° C. said chlorinated polyethylene being produced by the chlorination of polyethylene of 700,000 to 5,000,000 molecular weight, and at least 40 up to about 120 parts of a chlorinated hydrocarbon of 20–70% chlorine by weight and molecular weight between about 200 to 2,000.

11. A composition for use in producing highly flexible wire jacketing consisting essentially of a heat stabilized chlorinated polyethylene having a chlorine content between about 20–48% by weight, crystallinity of less than 1% as determined by differential thermal analysis and weight average molecular weight corresponding to an intrinsic viscosity between about 2.5 to 6 in o-dichlorobenzene at 100° C. said chlorinated polyethylene being produced by the chlorination of polyethylene of 700,000 to 5,000,000 molecular weight and at least 40 up to about 120 parts of a normally liquid chlorinated aliphatic hydrocarbon of 30–55% chlorine by weight and a molecular weight between about 300 to 1,000.

12. A wire jacketing composition comprising:
(A) 100 parts of chlorinated polyethylene having a chlorine content between about 20–48% by weight, crystallinity of less than 1% as determined by differential thermal analysis and weight average molecular weight corresponding to an intrinsic viscosity between about 2.5 to 6 in o-dichlorobenzene at 100° C. said chlorinated polyethylene being produced by the chlorination of polyethylene of 700,000 to 5,000,000 molecular weight;
(B) at least 40 up to 120 parts of a chlorinated hydrocarbon having chlorine content of about 20–70% by weight and a molecular weight between about 200 to 900;
(C) about 20 to 150 parts filler material; and
(D) about 1–15 parts of a curing agent selected from the group consisting of peroxides and a polyfunctional aromatic and aliphtic amines, and mixtures thereof.

13. A wire jacketing composition comprising:
(A) 100 parts of chlorinated polyethylene having a chlorine content between about 20–48% by weight, crystallinity of less than 1% as determined by differential thermal analysis and weight average molecular weight corresponding to an intrinsic viscosity between about 2.5 to 6 in o-dichlorobenzene at 100° C. said chlorinated polyethylene being produced by the chlorination of polyethylene of 700,000 to 5,000,000 molecular weight; at least 40 up to about 120 parts of a normally liquid chlorinated aliphatic hydrocarbon of 30–55% chlorine by weight and a molecular weight between about 300 to 1,000;
(C) about 20 to 150 parts filler material of which at least 10 parts is carbon black; and
(D) about 1–15 parts of a curing agent selected from the group consisting of peroxides and the polyfunctional aromatic and aliphatic amines, and mixtures thereof.

14. Wire jacketed with the vulcanizate of the composition of claim 12.

15. Wire jacketed with the vulcanizate of the composition of claim 13.

References Cited

UNITED STATES PATENTS

| | | | |
|---|---|---|---|
| 3,345,315 | 10/1967 | Barton et al. | 260—94.9 |
| 3,351,677 | 11/1967 | Barton et al. | 260—94.9 |
| 2,516,591 | 7/1950 | Remington | 260—41.5 |
| 2,467,550 | 4/1949 | Fletcher et al. | 260—23 |

OTHER REFERENCES

Raff and Doak, High Polymers, p. 255, vol. XX Part II.

ALLAN LIEBERMAN, Primary Examiner

R. BARON, Assistant Examiner

U.S. Cl. X.R.

260—28.5, 94.9